United States Patent Office 2,774,705
Patented Dec. 18, 1956

2,774,705

LAMINATION OF CHLORINATED OLEFINS

Richard A. Smith, Cornwall on the Hudson, N. Y., assignor to The M. W. Kellogg Company, Jersey City, N. J., a corporation of Delaware No Drawing. Application November 27, 1953,
Serial No. 394,900

24 Claims. (Cl. 154—139)

This invention relates to a method for laminating chlorinated olefin polymers. This invention additionally relates to an adhesive for bonding the surface of a chloroolefin polymer to itself and to other surfaces. This invention in one of its more particular aspects, relates to a process for laminatnig perfluorochloroolefin polymers.

The unusual chemical and physical characteristics of the perfluorochloroolefin polymers has led to their use in numerous applications. However, because of their unusual properties, the perfluorochloroolefin polymers are not susceptible to fabrication into useful end items by processes which have been developed for other thermoplastic polymers. Numerous attempts have been made to laminate the perfluorochloroolefins by processes which were found suitable with respect to other thermoplastics but with no success.

It is an object of this invention to provide a process for laminating chlorinated olefin polymers.

It is another object of this invention to provide an adhesive for use in preparing chlorinated olefin laminates.

It is another object of this invention to provide a process for bonding chlorinated olefin polymers to metals, such as copper, iron, steel, aluminum and brass and to non-metals such as glass and porcelain.

It is another object of this invention to provide a process for bonding chlorinated olefin polymers to natural fiber textiles, such as cotton, canvas and wool and to synthetic organic textiles, such as Saran (a copolymer of vinylidene chloride and vinyl chloride), heat resistant Orlon (a polymer of polyacrylonitrile) and to inorganic textiles such as fiberglass cloth and asbestos.

It is one of the more particular objects of this invention to provide a process for bonding perfluorochloroolefin polymers to themselves, and to other materials.

Various other objects and advantages will become apparent to those skilled in the art on reading the accompanying description and disclosure.

Generally, the above objects are accomplished by applying to or coating the surface of one of the components which is to be bonded with a liquefiable polymer of a perfluorochloroolefin such as trifluorochloroethylene. The surface thus coated is then placed in contact with the surface to which it is to be joined or bonded and the two surfaces are then maintained in contact under slight pressure and at elevated temperatures.

This invention relates particularly to the bonding or joining of perfluorochloroolefin polymer surfaces to other surfaces. The perfluorochloroolefin polymers which may be laminated by the process of this invention, are the normally solid thermoplastic polymers of perfluorochloroolefins such as trifluorochloroethylene, 1,1-dichloro, 2,2-difluoroethylene, 1,1,2-trichloromonofluoroethylene and 1,2-dichloro 1,2-difluoroethylene. It is also within the scope of this invention to laminate polymers of chlorinated olefins such as vinyl chloride, vinylidene chloride, etc. or in general any solid thermoplastic polymer of an olefin which contains at least one chlorine atom in the molecule. The term polymer includes both homopolymers and copolymers.

The surface of the second component to which the above described polymers may be joined or bonded includes the above described polymers themselves and other polymeric and nonpolymeric materials. Thus, the polymers which may be bonded by the process of this invention, may be laminated to metals such as iron, steel, aluminum and brass, and to other solid non-metallic materials such as glass and porcelain. In addition, the second component may be a natural fiber textile, such as cotton, canvas and wool, a synthetic organic textile such as nylon, heat resistant Orlon (polyacrylonitrile) and to inorganic textiles such as fiberglass, asbestos, etc.

The adhesive or bonding agent which is suitable for use in the lamination process of this invention, comprises the liquefiable polymers of the perfluorochloroolefins such as trifluorochloroethylene, in the oil, grease or wax range. The liquid or liquefiable polymers are prepared by polymerization of the monomer trifluorochloroethylene to produce oils, greases and soft waxes. Normally liquid polymers are preferred over the liquefiable polymers such as the greases and soft waxes. The greases and soft waxes have softening points below about 150° C. and preferably below about 100° C. The preferred liquid or liquefiable polymer is the homopolymer of trifluorochloroethylene since the homopolymer is more readily applied to a wider variety of materials. However, liquid or liquefiable copolymers in the oil, grease or soft wax range may also be used as adhesives and their use is within the scope of this invention.

A preferred liquid homopolymer of trifluorochloroethylene, is that which is generally known as telomer oil. The telomer oil is prepared by directly telomerizing or polymerizing the monomer trifluorochloroethylene with a catalyst, such as benzoyl peroxide, in the presence of sulfuryl chloride as the telogen to produce a substantially saturated telomer oil. The telogen, sulfuryl chloride, provides chlorine terminal groups, tends to control telomerization and terminates free radical reaction so that by varying the amount of telogen used, the telomeric material may be obtained in the desired form, that is as an oil, grease or wax which is recovered as the product of the process.

The reaction catalyst occurs essentially as shown below:

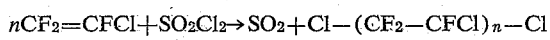

$$nCF_2=CFCl+SO_2Cl_2 \rightarrow SO_2+Cl-(CF_2-CFCl)_n-Cl$$

As shown, sulfur dioxide gas is formed as well as a clear polymeric mass, usually in gel-like form, which includes various grades of telomeric halocarbons, such as oils, greases and soft waxes. These telomeric halocarbons may be separated by conventional distillation. The distillable substances obtained by telomerizing chlorotrifluoroethylene compounds in the presence of sulfuryl chloride are sufficiently stable as not to absorb appreciable amounts of fluorine even though exposed to the gas for 24 hours at a temperature of 60° C. nor to significantly pyrolytically decompose at temperatures up to 200° C. This process may also be used to prepare copolymers or co-telomers of trifluorochloroethylene with halogenated olefins.

The mol ratio of sulfuryl chloride to monomer employed in these procedures is between about 2:1 and about 1:10, preferably between 1:1 and 1:4 depending upon the products desired and the starting materials used. The optimum mol ratio for producing primarily telomeric chlorotrifluoroethylene oils and greases, is 1:2 of the telogen to monomer. The telomerization may be carried out in the presence of a suitable inert solvent, if desired. The term inert solvent means any liquid which does not materially alter the normal telomerization of haloethylenic compounds in the presence of sulfuryl chloride, such as Freon 113, tetrachloroethylene or tetrachloroethane. It should be noted that water slowly reacts with sulfuryl chloride to form hydrochloric acid and sulfuric acid and therefore cautions should be taken to provide substantially anhydrous conditions. Glass lined equipment is usually desirable, however Monel and stainless steel have been used for polymerization and filtration apparatus without noticeable corrosion.

The preferred liquid homopolymers of trifluorochloroethylene are characterized by the presence in the molecule of an even number of carbon atoms and of chlorine terminal groups. Those liquid homopolymers or telomers, which are suitable to the process of this invention, contain between about 4 and about 15 monomer units in the chain. A typical analysis of the preferred liquid homopolymer shows a chlorine content of 31.1% and a fluorine content of 46.2%. The preparation of the above telomer is described in detail in pending application Serial No. 294,495 of William S. Barnhart, filed June 19, 1953.

Another liquefiable polymer of trifluorochloroethylene is prepared by the polymerization of the monomer of trifluorochloroethylene to produce oils, greases and soft waxes but without the presence of the sulfuryl chloride, telogen. Liquid polymers prepared by polymerization in the absence of a telogen are characterized by a lower chlorine content; by the presence of an odd number of carbon atoms and by the existence of branch chains in the molecule. These liquid polymers are generally known as cracked oils and show a fluorine content of about 49.2% and a chlorine content of about 29.3%.

In employing the adhesives of this invention, the adhesive is preferably dissolved in an organic solvent. Illustrative of the solvents which may be employed are ketones, such as acetone, methyl ethyl ketone, di-isobutyl ketone, and cyclohexanone; esters such as ethyl formate, butyl acetate and benzyl acetate; glycol ethers; and chlorinated hydrocarbons such as methylene dichloride and ethylene dichloride. The concentration of the adhesives in the solution, may be between about 1 and about 50% by weight, preferably between about 10 and about 30% by weight.

The adhesive is applied to the surface of one or both of the components that are to be adhesively joined or bonded by any convenient technique. If a solution of the adhesive is used, the solution may be applied by brushing, spraying, dipping or any other convenient procedure. If applied without the aid of a solvent, brush, spray or dip techniques may also be used. A solvent is preferred, since the thickness of the adhesive coating may then be more readily controlled. When a solvent is used, the solvent is preferably evaporated before the adhesive is placed in contact with the second surface. Evaporation, before contact is made with the second surface, is preferably achieved by heating at elevated temperatures, up to 100° C. in an oven or by circulating heated air although air drying at ambient temperatures may be used where time is not a factor. When the solvent is to be evaporated after the surfaces have been contacted the heat used to effect the bond is usually sufficient. The coated surface or surfaces of the components which are to be joined, are then brought into contact and the resulting assembly is then held in position under slight pressure that is, above about 5 pounds per square inch gage and at a temperature of at least 135° C. and below the decomposition temperature of the materials which are being laminated. Usually temperature is maintained between about 140° C. and about 300° C. preferably between about 165° C. and about 200° C. Pressures substantially in excess of 5 pounds per square inch that is, up to about 25,000 pounds per square inch may also be employed, although no particular advantages accrues from the use of such elevated pressures. A pressure between about 20 and about 80 pounds per square inch is preferred. The time necessary to effect binding is usually between 0.5 second and 10 minutes preferably between 10 seconds and 2 minutes.

In order to illustrate the process of this invention, the following examples, which are offered for purpose of illustration and which are not to be construed as unnecessarily limiting, are given.

*Example I*

A homopolymer of trifluorochloroethylene (N. S. T. (No Strength Temperature) about 280) was coated with a solution of a liquid polymer of trifluorochloroethylene in methyl ethyl ketone. The solvent was allowed to evaporate after which another film of a homopolymer of trifluorochloroethylene was placed in contact with the coated portion of the first film. This assembly was then heated in a press maintained at a temperature of about 170° C. and a pressure of about 45 pounds per square inch gage. The N. S. T. of the resulting laminate was equivalent to the N. S. T. of the original polymer. The two films were firmly bonded together.

*Example II*

An iron disk was coated with a dispersion of a homopolymer of trifluorochloroethylene (N. S. T. about 280). The coated disk was baked so as to fuse the particles of the polymer in the dispersion, thereby producing a homogeneous coating on the iron disk. A 5 mil layer of a homopolymer of trifluorochloroethylene was coated with a solution of telomer oil in methyl ethyl ketone. The solvent was allowed to evaporate and the coated 5 mil film was placed in contact with the coated iron disk. This assembly was then heated as described in Example I. Adhesion was excellent. The applied film broke before the bond could be opened.

*Example III*

A brass plate was thoroughly cleaned and a coating of telomer oil applied thereto. A film formed from a homopolymer of trifluorochloroethylene (N. S. T. about 280) was also coated with telomer oil. The coated surfaces were then placed in contact; heated to about 170° C. in a press maintained at about 45 pounds per square inch gage for about 2 minutes. The bond thus produced was strong and could not be opened except by destroying the coating. By the same process, sheets of iron, aluminum and copper were coated.

*Example IV*

A 5 mil layer of a homopolymer of trifluorochloroethylene was coated with telomer oil as described above. The coated surface was placed in contact with cotton cheesecloth. This assembly was treated as described in Example I to produce a firmly bonded laminate. The process of this example was repeated with equal success using fiberglass, heat resistant Orlon (polyacrylonitrile) and paper.

*Example V*

The process of Example IV was repeated except that both sides of the fabric were coated. Then 2 sheets of the polymer were coated with telomer oil as described above and each of the coated surfaces was placed in contact with the fiberglass fabric. This assembly was then pressed, as described above, and the resulting laminate examined. A firm bond was observed.

From the above, it can be seen that the process of this invention makes it possible to apply a perfluorochloroolefin polymer coating or protective surface to a wide variety of materials. Thus, many new uses for the perfluorochloroolefin polymers are now possible. For example, by the process of this invention, conveyor belts may be made having as a surface the highly resistant perfluorochloroolefin polymers. Tank linings may also be prepared from these laminates. In addition, these polymers may be used as insulation in electrical conductors. For example, a polytrifluorochloroethylene tape may be coated on one surface with the adhesive of this invention and the tape spirally wound around the electrical conductor that is to be insulated. The insulator, thus taped, is then heated under slight pressure, as described above, to produce an impervious insulation.

Various alterations and modifications of the invention and its aspects may become apparent to those skilled in the art without departing from the scope of this invention.

Having thus described my invention, I claim:

1. A process for bonding a chlorinated olefin polymer surface to another surface which comprises applying to at least one of the surfaces a liquefiable polymer of trifluorochloroethylene selected from the group consisting of oils, greases and waxes having a softening point below about 150° C., contacting the coated surface with the surface to which it is to be bonded and maintaining the surfaces in contact at a temperature of at least 135° C. and below the decomposition temperature of said surfaces and said liquefiable polymer and a pressure of at least 5 pounds per square inch gage.

2. The process of claim 1 in which the chlorinated olefin polymer is a polymer of trifluorochloroethylene.

3. The process of claim 1 in which the chlorinated olefin polymer is a polymer of vinyl chloride.

4. The process of claim 1 in which the chlorinated olefin polymer is a polymer of vinylidene chloride.

5. A process for bonding a chlorinated olefin polymer surface to a metal surface which comprises applying to at least one of the surfaces a liquefiable polymer of trifluorochloroethylene selected from the group consisting of oils, greases and waxes having a softening point below about 150° C., contacting the coated surface with the surface to which it is to be bonded and maintaining the surfaces in contact at a temperature of at least 135° C. and below the decomposition temperature of said surfaces and said liquefiable polymer and a pressure of at least 5 pounds per square inch gage.

6. The process of claim 5 wherein the metal is iron.

7. A process for bonding a chlorinated olefin polymer surface to a synthetic organic fiber surface which comprises applying to at least one of the surfaces a liquefiable polymer of trifluorochloroethylene selected from the group consisting of oils, greases and waxes having a softening point below about 150° C., contacting the coated surface with the surface to which it is to be bonded and maintaining the surfaces in contact at a temperature of at least 135° C. and below the decomposition temperature of said surfaces and said liquefiable polymer and a pressure of at least 5 pounds per square inch gage.

8. The process of claim 7 wherein the synthetic organic fiber is polyacrylonitrile.

9. A process for bonding a chlorinated olefin polymer surface to a natural fiber surface which comprises applying to at least one of the surfaces a liquefiable polymer of trifluorochloroethylene selected from the group consisting of oils, greases and waxes having a softening point below about 150° C., contacting the coated surface with the surface to which it is to be bonded and maintaining the surfaces in contact at a temperature of at least 135° C. and below the decomposition temperature of said surfaces and said liquefiable polymer and a pressure of at least 5 pounds per square inch gage.

10. The process of claim 9 wherein the natural fiber is a cotton fabric.

11. A process for bonding a chlorinated olefin polymer surface to an inorganic fiber surface which comprises applying to at least one of the surfaces a liquefiable polymer of trifluorochloroethylene selected from the group consisting of oils, greases and waxes having a softening point below about 150° C., contacting the coated surface with the surface to which it is to be bonded and maintaining the surfaces in contact at a temperature of at least 135° C. and below the decomposition temperature of said surfaces and said liquefiable polymer and a pressure of at least 5 pounds per square inch gage.

12. The process of claim 11 wherein the inorganic fiber is a fiberglass fabric.

13. A process for bonding a chlorinated olefin polymer surface to a chlorinated olefin polymer surface which comprises applying to at least one of the surfaces a coating comprising a liquefiable polymer of trifluorochloroethylene selected from the group consisting of oils, greases and waxes having a softening point below about 150° C., contacting the coated surface with the surface to which it is to be bonded and maintaining the surfaces in contact at a temperature of at least 135° C. and below the decomposition temperature of said surfaces and said liquefiable polymer and a pressure of at least 5 pounds per square inch gage.

14. The process of claim 13 wherein the chlorinated olefin polymer surface is trifluorochloroethylene.

15. A process for bonding a chlorinated olefin polymer surface to another surface which comprises applying to at least one of the surfaces a normally liquid oily polymer of trifluorochloroethylene, contacting the coated surface with the surface to which it is to be bonded and maintaining the surfaces in contact at a temperature between about 140° C. and about 300° C. and a pressure of at least 5 pounds per square inch gage.

16. A process for bonding a chlorinated olefin polymer surface to another surface which comprises applying to at least one of the surfaces a normally liquid oily polymer of trifluorochloroethylene, contacting the coated surface with the surface to which it is to be bonded and maintaining the surfaces in contact at a temperature between about 165° C. and about 200° C. and a pressure between about 20 and about 80 pounds per square inch gage.

17. A process for bonding a chlorinated olefin polymer surface to another surface which comprises applying to at least one of the surfaces an organic solvent admixed with a normally liquid oily polymer of trifluorochloroethylene, evaporating said organic solvent, contacting the coated surface with the surface to which it is to be bonded and maintaining the surfaces in contact at a temperature between about 140° C. and about 300° C. and a pressure of at least 5 pounds per square inch gage.

18. The process of claim 17 wherein the organic solvent is acetone.

19. The process of claim 17 wherein the organic solvent is methyl ethyl ketone.

20. The process of claim 17 wherein the organic solvent is butyl acetate.

21. The process of claim 17 wherein the organic solvent is methylene dichloride.

22. The process of claim 17 wherein the organic solvent is ethylene dichloride.

23. A process for bonding a chlorinated olefin polymer surface to another surface which comprises applying to at least one of the surfaces an organic solvent admixed with a normally liquid oily polymer of trifluorochloroethylene, evaporating said organic solvent and subsequently contacting the coated surface with the surface to which it is to be bonded and maintaining the surfaces in contact at a temperature between about 140° C. and about 300° C. and a pressure between about 20 and about 80 pounds per square inch gage for a period of time between about 0.5 second and about 10 minutes.

24. A process for bonding a chlorinated olefin polymer surface to another surface which comprises applying to at least one of the surfaces an organic solvent admixed with a normally liquid oily polymer of trifluorochloroethylene, evaporating said organic solvent after contacting the coated surface with the surface to which it is to be bonded and maintaining the surfaces in contact at a temperature between about 140° C. and about 300° C. and a pressure between about 20 and about 80 pounds per square inch gage for a period of time between about 0.5 second and about 10 minutes.

References Cited in the file of this patent

UNITED STATES PATENTS

| | | |
|---|---|---|
| 1,146,387 | Aylsworth | July 13, 1915 |
| 2,377,846 | Dreyfus et al. | June 5, 1945 |
| 2,392,388 | Joyce | Jan. 8, 1946 |
| 2,484,483 | Berry | Oct. 11, 1949 |
| 2,484,484 | Berry | Oct. 11, 1949 |
| 2,538,808 | Swiss | Jan. 23, 1951 |
| 2,630,398 | Brooks et al. | Mar. 3, 1953 |
| 2,694,029 | Skinner | Nov. 9, 1954 |
| 2,705,691 | Panagrossi et al. | Apr. 5, 1955 |

FOREIGN PATENTS

| | | |
|---|---|---|
| 660,398 | Great Britain | Nov. 7, 1951 |

OTHER REFERENCES

Modern Plastics, October 1948, pages 168, 170, 172.